(12) United States Patent
Peri et al.

(10) Patent No.: US 10,341,199 B2
(45) Date of Patent: Jul. 2, 2019

(54) STATE SYNCHRONIZATION IN A SERVICE ENVIRONMENT

(71) Applicant: Adobe Inc., San Jose, CA (US)

(72) Inventors: Srinivas Peri, San Jose, CA (US); Aya Ivtsan, Toronto (CA)

(73) Assignee: Adobe Inc., San Jose, CA (US)

( * ) Notice: Subject to any disclaimer, the term of this patent is extended or adjusted under 35 U.S.C. 154(b) by 175 days.

(21) Appl. No.: 13/943,562

(22) Filed: Jul. 16, 2013

(65) Prior Publication Data

US 2015/0026323 A1    Jan. 22, 2015

(51) Int. Cl.
   *G06F 15/173* (2006.01)
   *H04L 12/24* (2006.01)
   *H04L 29/08* (2006.01)
   *G06F 8/65* (2018.01)

(52) U.S. Cl.
   CPC ...... *H04L 41/5045* (2013.01); *H04L 41/5058* (2013.01); *H04L 67/16* (2013.01); *H04L 67/26* (2013.01); *H04L 67/34* (2013.01); *G06F 8/65* (2013.01)

(58) Field of Classification Search
   CPC ........ G06F 8/65; G06F 8/61; G06F 17/30174; G06F 17/30247; G06F 17/30168; G06F 9/455; G06F 9/4492; G06F 9/5055; G06F 11/3476; H04L 67/10; H04L 67/303; H04L 65/1013; H04L 41/0893; H04L 41/046; H04L 41/0866; H04L 41/0886
   See application file for complete search history.

(56) References Cited

U.S. PATENT DOCUMENTS

| | | | | |
|---|---|---|---|---|
| 7,124,289 B1* | 10/2006 | Suorsa | ...... | G06F 8/61 713/1 |
| 7,684,964 B2* | 3/2010 | Outhred | ...... | G06F 9/4492 703/2 |
| 8,775,572 B2* | 7/2014 | Gbadegesin et al. | ...... | 709/220 |
| 2005/0076325 A1* | 4/2005 | Bergin | ...... | G06F 8/65 717/100 |
| 2006/0075001 A1* | 4/2006 | Canning | ...... | G06F 8/65 |
| 2008/0168126 A1* | 7/2008 | Freedman | ...... | H04L 51/00 709/202 |
| 2009/0204702 A1* | 8/2009 | Jensen | ...... | H04L 41/046 709/224 |
| 2010/0106678 A1* | 4/2010 | Pietrek | ...... | G06F 11/3476 706/54 |
| 2010/0131084 A1* | 5/2010 | Van Camp | ...... | G06F 8/65 700/86 |

(Continued)

*Primary Examiner* — Dustin Nguyen
(74) *Attorney, Agent, or Firm* — SBMC (57) ABSTRACT

Techniques for state synchronization in a service environment are described. In at least some embodiments, different synchronization models are employed to synchronize state for resources in a service environment. For instance, embodiments may employ a "pull model" whereby a resource periodically queries for changes in resource state to be applied to the resource. Alternatively or additionally, a "push model" can be employed whereby notifications are pushed to resources, informing the resources that they are to update their state. Thus, based on various considerations for a service environment, instances and/or combinations of the disclosed synchronization models can be implemented.

20 Claims, 7 Drawing Sheets

(56) References Cited

U.S. PATENT DOCUMENTS

| | | | |
|---|---|---|---|
| 2011/0047537 A1* | 2/2011 | Yu | G06F 8/61 |
| | | | 717/173 |
| 2011/0321031 A1* | 12/2011 | Dournov | G06F 8/65 |
| | | | 717/171 |
| 2012/0079095 A1* | 3/2012 | Evans | G06F 8/61 |
| | | | 709/224 |
| 2012/0110150 A1* | 5/2012 | Kosuru et al. | 709/221 |
| 2012/0174095 A1* | 7/2012 | Natchadalingam et al. | 718/1 |
| 2012/0266156 A1* | 10/2012 | Spivak | G06F 9/5055 |
| | | | 717/172 |
| 2013/0212562 A1* | 8/2013 | Fox et al. | 717/120 |
| 2014/0280476 A1* | 9/2014 | Chiussi et al. | 709/203 |
| 2014/0359602 A1* | 12/2014 | Sawaya et al. | 717/176 |
| 2017/0257279 A1* | 9/2017 | Mishra | H04L 41/0886 |

\* cited by examiner

STATE SYNCHRONIZATION IN A SERVICE ENVIRONMENT

BACKGROUND

The traditional paradigm for providing software via local installation on client devices is gradually shifting to cloud-based services. Cloud-based service delivery, however, is highly complex. For instance, deployment of cloud-based services typically involves accounting for multiple deployment environments, different deployment locations, varying infrastructures, scalability, security, and so forth. These complexities can lead to deployment problems, such as caused by errors that may occur in manual steps in the deployment pipeline. Current solutions for dealing with these complexities suffer from a number of deficiencies. For instance, current solutions typically don't provide a simple way to access information regarding the various deployment processes. Further, current solutions typically aren't extensible to support multiple different services.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques for state synchronization in a service environment are described. In at least some embodiments, different synchronization models are employed to synchronize state for resources in a service environment. For instance, embodiments may employ a "pull model" whereby a resource periodically queries for changes in resource state to be applied to the resource. Alternatively or additionally, a "push model" can be employed whereby notifications are pushed to resources, informing the resources that they are to update their state. Thus, based on various considerations for a service environment, instances and/or combinations of the disclosed synchronization models can be implemented.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Techniques for state synchronization in a service environment are described. According to various embodiments, a service environment refers to various architectures for providing services. For instance, a service environment can include a cloud-based architecture, services hosted via a data center, an enterprise facility that hosts a service environment, an educational and/or government-based service environment, and so forth.

Services as discussed herein include a variety of different functionalities. For example, services can refer to functionalities traditionally provided by locally-installed applications, such as word processing, content editing (e.g., images, video, audio, and so forth), messaging (e.g., email), content consumption, and so forth. These service types are presented for purpose of example only, and embodiments can be employed for a wide variety of different services and in a wide variety of different service environments.

According to various embodiments, a service environment includes different resources that together form an infrastructure that supports the service environment. A service environment, for instance, includes service nodes that implement various functionalities for the service environment. Examples of service nodes include servers, storage devices, virtual devices (e.g., virtual machines), and so forth, that are leveraged to perform various tasks for a service environment. For instance, a particular service node may host application code that provides a service interface for service clients, while another service node may provide database services for the service environment. Thus, different roles can be defined for different service nodes in a service environment.

As part of provisioning and/or maintaining service nodes in a service environment, the state of the service nodes may be synchronized with a state specified for the service nodes. For instance, when a service is initially provisioned on a service node, synchronizing the service node can include installing service software on the service node for the first time. After service code is installed on a service node, the service code may occasionally be patched. For instance, functionality of service code can be repaired to fix errors, security vulnerabilities, and so forth. Alternatively or additionally, functionality of service code can be extended to provide additional functionality, and/or altered to change existing functionality. Thus, synchronizing a service node can include patching existing software of a service node.

In at least some embodiments, different synchronization models are employed to synchronize state for different service nodes. For instance, embodiments may employ a "pull model" whereby a service node periodically queries for changes in node state to be applied to the service node, such as software patches. Alternatively or additionally, a "push model" can be employed whereby notifications are pushed to service nodes, informing the service nodes that the nodes are to update their state. Thus, based on various considerations for a service environment, instances and/or combinations of the disclosed synchronization models can be implemented.

As an example implementation, consider a scenario where an enterprise entity (e.g., a retail business) employs a cloud-based service environment to provide an inventory management service. The cloud-based service environment includes various service nodes that implement different functionalities of the inventory management service. For instance, some service nodes can provide a graphical user interface (GUI) for the service, while other service nodes can perform database management for the service.

Further to the example scenario, consider that an update to the GUI is generated, such as by a software developer for the inventory management service. The update, for instance, can be hosted by a particular resource as an update package, e.g., software code. According to a pull model for synchronization, a service node that hosts the GUI can query to ascertain whether an update is available. In response to the query, the service node can be notified of the update to the GUI. Thus, the service node can retrieve and install the update package to synchronize its state, e.g., to implement the update to the GUI.

Alternatively or additionally, according to a push model for synchronization, the service node for the GUI can be notified that the update is available. In response to the notification, the service node can retrieve and install the update package to synchronize its state. As detailed below, the pull model and the push model for synchronization can be employed based on various synchronization factors in a service environment.

In the following discussion, an example environment is first described that is operable to employ techniques for state synchronization in a service environment described herein. Next, a section entitled "Example Implementation Scenarios" describes some example implementation scenarios in accordance with one or more embodiments. Following this, a section entitled "Example Procedures" describes some example methods in accordance with one or more embodiments. Finally, a section entitled "Example System and Device" describes an example system and device that are operable to employ techniques discussed herein in accordance with one or more embodiments.

Example Environment

Figure 1:
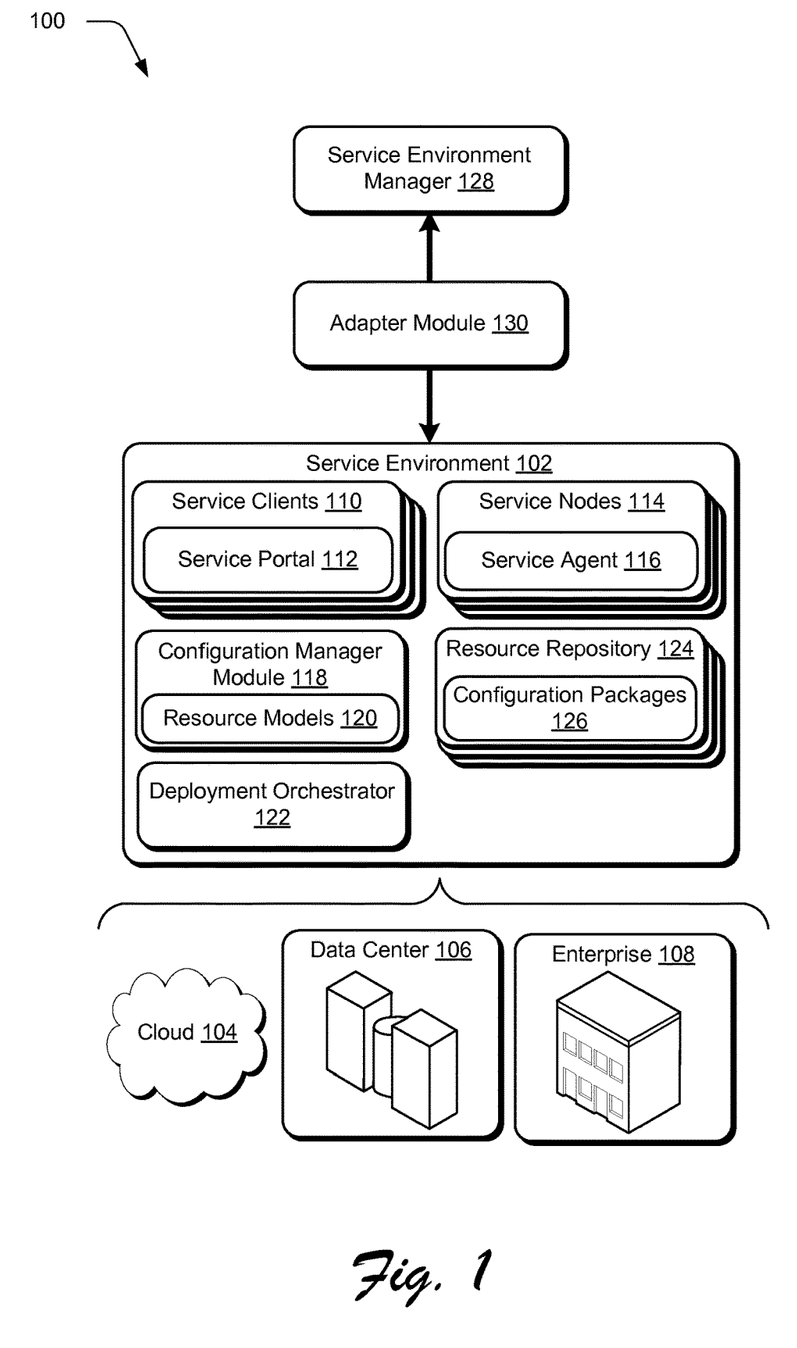
FIG. 1 is an illustration of an environment in an example implementation that is operable to employ techniques discussed herein in accordance with one or more embodiments.

FIG. 1 is an illustration of an environment 100 in an example implementation that is operable to employ techniques for state synchronization in a service environment discussed herein. Environment 100 includes a service environment 102, which is representative of an environment in which various services can be provided. As referenced above, services generally represent functionalities to perform various tasks, such as tasks traditionally enabled via applications. Example implementations of the service environment 102 include a cloud environment 104, a data center 106, an enterprise facility 108, and so forth.

The service environment 102 includes service clients 110, which are representative of end-user devices that can leverage services provided via the service environment 102 to perform various tasks. Each of the service clients 110 includes a service portal 112, which is representative of functionality to enable access to services. The service portal 112, for instance, represents a web browser and/or other web platform application that can process various types of web-based content. This is not intended to be limiting, however, and the service portal 112 generally represents any suitable functionality for interacting with services in various ways. The service portal 112, for instance, can represent a GUI for accessing and interacting with a service.

To enable various aspects of services to be provided and managed for the service clients 110, the service environment 102 includes service nodes 114. Generally, the service nodes 114 represent functionalities that serve different roles in a service pipeline. Examples of the service nodes 114 include resources that run the service code itself, such as application code for performing various tasks that can be accessed via the service portal 112 of the service clients 110. The service nodes 114 can perform other roles for the service environment 102, such as health monitoring for services, maintaining databases, logging service interactions, metering of service availability, and so forth.

Thus, the particular collection of tasks that a service node performs can be based on a respective role in the service environment 102. For instance, each of the service nodes 114 is associated with a respective role in the service environment 102, and different instances and/or groups of the service nodes 114 can assume different roles.

Each of the service nodes 114 includes a service agent 116, which is representative of functionality to enable a state of respective service nodes 114 to be updated. In at least some embodiments, the service agent 116 for a particular instance of the service nodes 114 is configured based on a role for the respective service node. Thus, different instances of the service agents 116 can be configured to assist in synchronizing a state of a respective service node 114 according to a role for the service node. Further implementation details concerning the service agent 116 are discussed below.

The service environment 102 further includes a configuration manager module 118, which maintains various resource models 120. The configuration manager module 118 is representative of functionality to maintain current state information for the service nodes 114. The resource models 120 represent different states for different resources, and are modifiable to indicate changes in resource state. For instance, each of the resource models 120 corresponds to a role specified for the service nodes 114. Further, each of the resource models 120 indicates a current state for a respective role. As presented in detail below, the state of a particular resource model 120 can be changed, and the state change can be propagated to a respective service node 114.

To enable various resources of the service environment 102 to be configured and reconfigured, a deployment orchestrator 122 is provided. Generally, the deployment orchestrator 122 is representative of functionality to track resources in the service environment 102, and to communicate notifications to the resources. For instance, the deployment orchestrator 122 maintains an entry for each of the service nodes 114 such that it knows a role for each of the service nodes 114, and is able to communicate with each of the service nodes 114. As further detailed below, at least some implementations leverage the deployment orchestrator 122 to enable state synchronization for the service nodes 114.

A package repository 124 is further included, which is representative of functionality to store configuration packages 126 for resources of the service environment 102. According to various embodiments, the configuration packages 126 represent portions of code (e.g., software packages) that can be used to modify a state of a resource in the service environment 102. For instance, the service nodes 114 can retrieve and/or receive instances of the configuration packages 126 to enable modifications to the service nodes 114. The configuration packages 126, for example, include code that can be employed to provision a service on the service nodes 114, to fix code errors (e.g., bugs) in the service nodes 114, to update functionality of the service nodes 114, and so forth.

To enable the various resources of the service environment 102 to be integrated into a cohesive service architecture, the environment 100 includes a service environment manager 128. Generally, the service environment manager 128 provides different workflows as part of service provisioning, delivery, management, and so forth. The service environment manager 128, for example, includes software, application programming interfaces (APIs), graphical user interfaces (GUIs), and/or other functionalities that enable various aspects of the techniques for state synchronization in a service environment discussed herein.

Interaction between the service environment manager 128 and the service environment 102 occurs via an adapter module 130, which is representative of functionality pass various events and information back and forth between the service environment manager 128 and the service environment 102.

The service environment manager 128, for instance, is agnostic as to an environment with which it communicates. Thus, the adapter module 130 presents an interpretation layer that converts communication from the service environment 102 into a form that is understood by the service environment manager 128, and vice versa. In at least some embodiments, different instances of the adapter module 130 can be generated for different service environments, thus enabling techniques discussed herein to be utilized in different environment architectures and implementations.

The different entities and resources of the environment 100 can communicate with one another in a variety of ways, such as via wired and/or wireless networks. Such networks may assume a variety of different configurations, such as a local area network (LAN), a wide area network (WAN), the Internet, and so on. Functionalities discussed with reference to the environment 100 and/or other portions of the discussion herein may be implemented in a distributed environment (e.g., "over the cloud"), as further described in relation to FIG. 9.

Having described an example environment in which the techniques described herein may operate, consider now a discussion of some example implementation scenarios in accordance with one or more embodiments.

Example Implementation Scenarios

Figure 2:
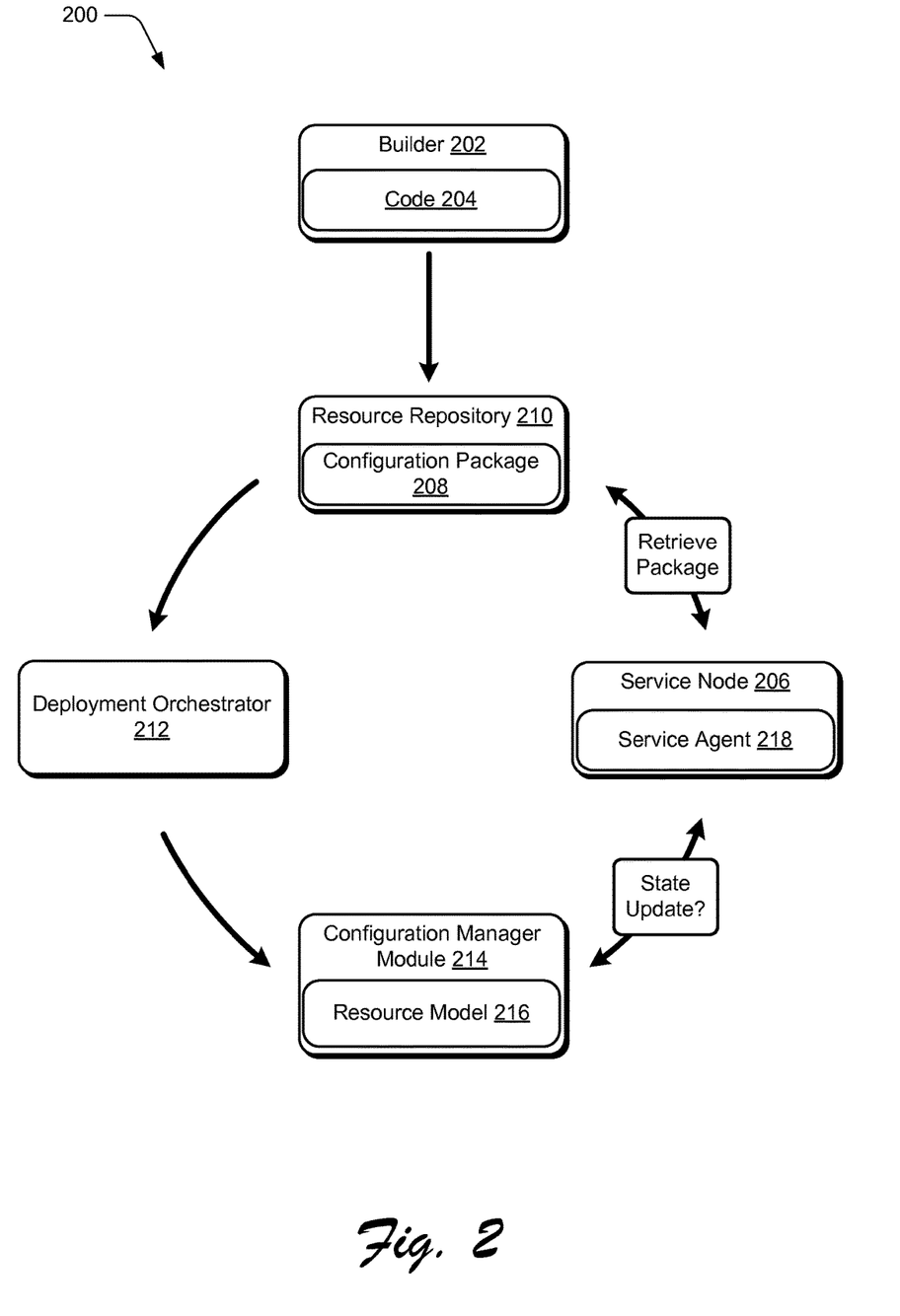
FIG. 2 illustrates an example implementation scenario in accordance with one or more embodiments.

FIG. 2 illustrates an example implementation scenario, generally at 200. The scenario 200 illustrates an example implementation of a "pull model" for synchronizing resource state in a service environment in accordance with one or more embodiments. The scenario 200 includes different types of entities introduced above in the discussion of FIG. 1.

Starting in the upper portion of the scenario 200, a builder 202 generates code 204 to be propagated to a service node 206. The builder 202 is representative of various types of entities, such as a software developer, information technology (IT) personnel, and so forth. The code 204 is representative of executable code that is configured to modify a state (e.g., a software state, a firmware state, and so forth) of the service node 206. The code 204, for example, can represent a software patch that repairs, updates, and/or reconfigures functionality of the service node 206. Alternatively or additionally, the code 204 represents a new service to be installed on the service node 206.

Continuing with the scenario 200, the code 202 is processed to produce a configuration package 208, which is stored on and/or accessible via a resource repository 210. The code 202, for instance, is compiled and/or processed in various ways such that it can be installed on the service node 206 via the configuration package 208. For example, the configuration package 208 represents a web application archive (WAR) file that defines at least some portions of a web application that is enabled via a service environment according to techniques discussed herein. In at least some embodiments, the resource repository 210 can physically store the configuration package 208, and/or can include a link (e.g., a pointer) to a different location at which the configuration package 208 is stored.

Proceeding with the scenario 200, a deployment orchestrator 212 is notified that a state change is to be propagated to the service node 206. The deployment orchestrator 212, for instance, can be notified by the builder 202 and/or other entity. In response, the deployment orchestrator 212 notifies a configuration manager module 214 that a resource model 216 for the service node 206 is to be updated. The deployment orchestrator 212, for instance, can pass state information (e.g., metadata) that describes the configuration package 208 to the configuration manager module 214. For example, the state information can indicate that a new version of software is available to be installed on the service node 206. The configuration manager module 214 can update the resource model 216 based on the state information. In at least some embodiments, the resource model 216 represents a state description for a particular resource, but does not include the actual code for synchronizing the resource to the state description.

Further to the scenario 200, a service agent 218 that resides on and/or is leveraged by the service node 206 queries the configuration manager module 214 to determine if any state updates have become available since the service node 206 was last updated. The service agent 218, for instance, can query the configuration manager module 214 with an identifier for a current software state (e.g., version) that resides on the service node 206. The configuration manager module 214 compares the identifier for the software state to the resource model 216 and determines that the service node 206 is to be updated to reflect the update to the resource model 216.

In accordance with one or more embodiments, the service agent 218 is configured to automatically query the configuration manager module 214 for updates to the resource model 216 on a periodic basis.

Accordingly, the configuration manager module 214 notifies the service agent 218 that the configuration package 208 is available to update the service node 206. In response to the notification, the service agent 218 retrieves the configuration package 208 from the resource repository 210. The configuration package 208 is then installed on the service node 206, such as to update existing functionality, install new functionality (e.g., a new service), and so forth. The scenario 200, for example, can be employed to maintain and update existing software, and/or as part of new software deployment.

Figure 3:
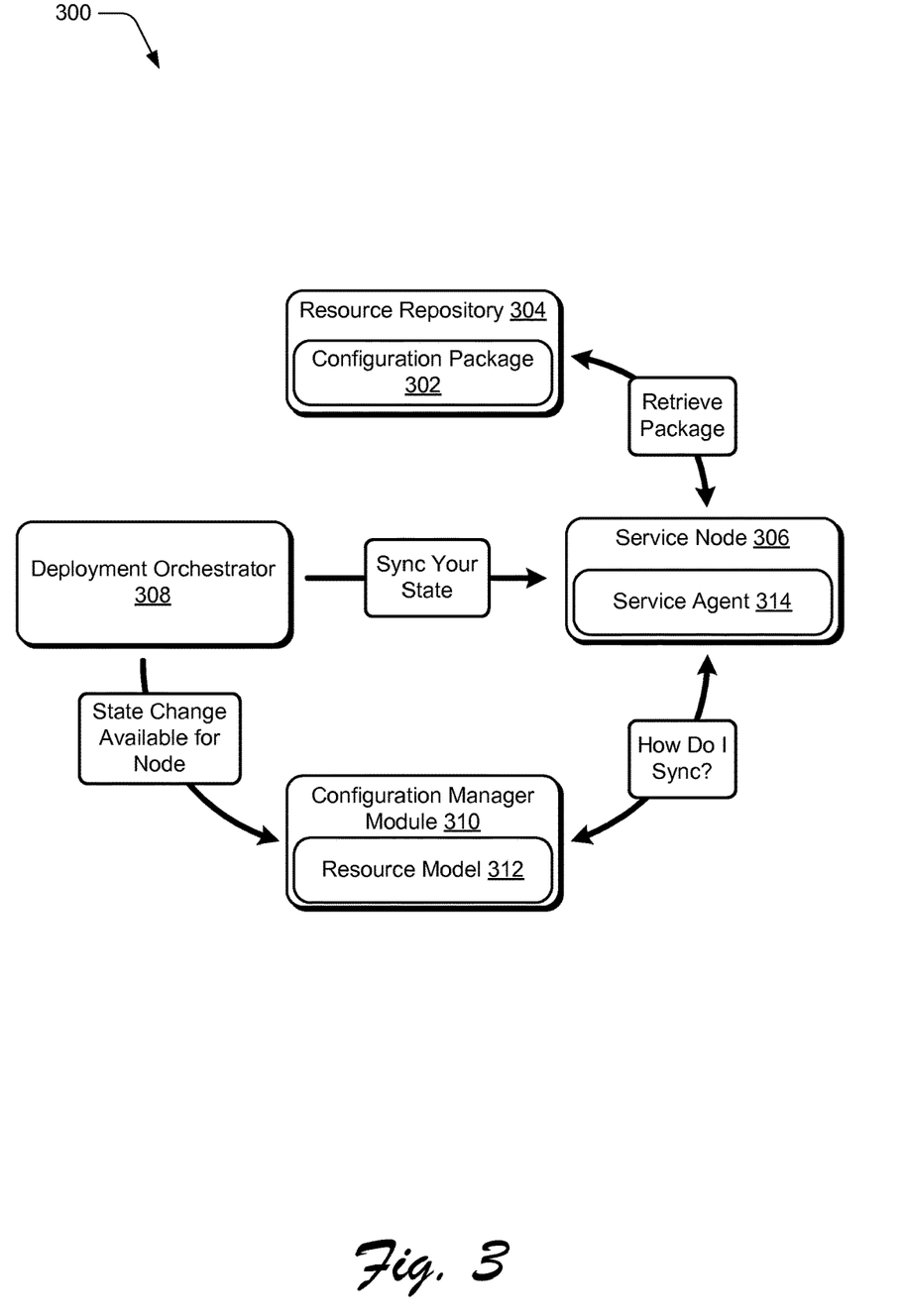
FIG. 3 illustrates an example implementation scenario in accordance with one or more embodiments.

FIG. 3 illustrates an example implementation scenario, generally at 300. The scenario 300 illustrates an example implementation of a "push model" for synchronizing resource state in a service environment in accordance with one or more embodiments. The scenario 300 includes different types of entities introduced above in the discussion of FIG. 1.

Starting in the upper portion of the scenario 300, a new configuration package 302 is populated to a resource repository 304, such as discussed above with reference to FIG. 2. The configuration package 302 includes a change to a state of a service node 306, such as an update to an existing service, and/or a new service installation.

Continuing with the scenario 300, a deployment orchestrator 308 notifies a configuration manager module 310 that a state change is to be propagated to the service node 306.

For instance, a builder and/or other entity can leverage the deployment orchestrator 308 to provide the notification.

The deployment orchestrator 308, for instance, can pass state information (e.g., metadata) that describes the change in state to the configuration manager module 310. For example, the state information can indicate that a new version of software is available to be installed on the service node 306. The configuration manager module 310 updates a resource model 312 based on the state information.

Further to the scenario 300, the deployment orchestrator 308 notifies a service agent 314 on the service node 306 that the service node 306 is to be synchronized, e.g., that an update to the state of the service node 306 is available. The notification to the service agent 314, for instance, can be independent of a query from the service agent 314 for state information for the service node 306.

In response to the notification from the deployment orchestrator 308, the service agent 314 queries the configuration manager module 310 to determine the nature of the sync. As referenced above, for instance, the service agent 314 can provide the configuration manager module 310 with an identifier for a current state of the service node 306. The configuration manager module 310 compares the current state of the service node 306 with the resource model 312, and determines based on the resource model 312 that the configuration package 302 is to be installed on the service node 306.

Accordingly, the configuration manager module 310 notifies the service agent 314 that an update for the service node 306 is available via the configuration package 302 at the resource repository 304. In response, the service agent 314 retrieves the configuration package 302 from the resource repository 304. The configuration package 302 is then installed on the service node 306, e.g., to synchronize the state of the service node 306 with the state indicated by the resource model 312.

Thus, the scenario 300 illustrates a "push" model for state synchronization in a service environment, e.g., where service nodes are proactively notified that state updates are to be applied. In at least some embodiments, the described push model can be employed as an alternative and/or an addition to the pull model described above with reference to FIG. 2.

Figure 4:
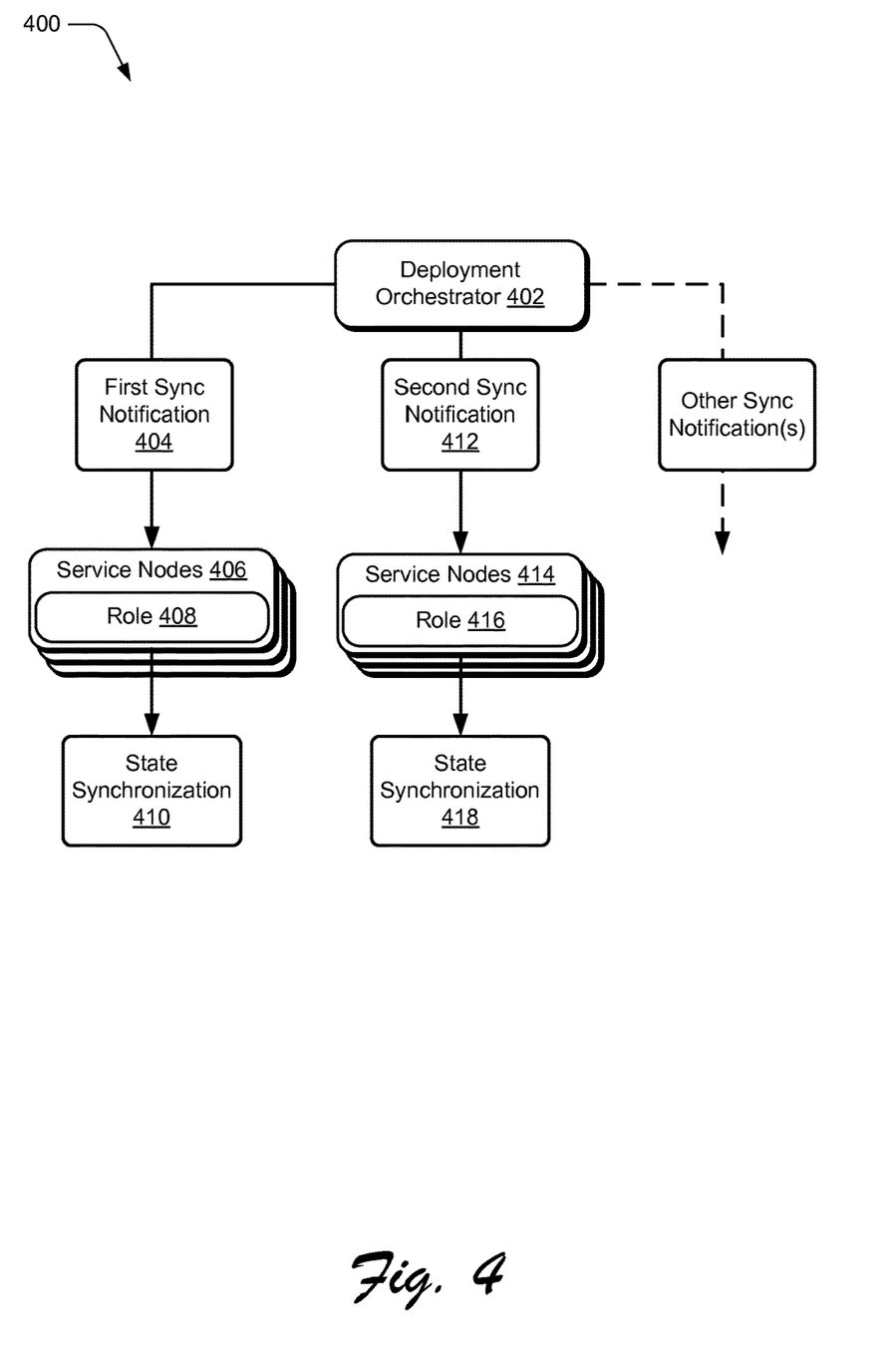
FIG. 4 illustrates an example implementation scenario in accordance with one or more embodiments.

FIG. 4 illustrates an example implementation scenario, generally at 400. The scenario 400 illustrates an example of an ordered synchronization of nodes in accordance with one or more embodiments. The scenario 400, for example, can employ the push model for synchronizing resource state in a service environment. The scenario 400 includes different types of entities introduced above in the discussion of FIG. 1.

In the scenario 400, a deployment orchestrator 402 submits a first sync notification 404 to service nodes 406 associated with a role 408. According to various embodiments, the role 408 corresponds to a particular role in a service environment. The first sync notification 404, for example, can be submitted to service agents of the service nodes 406. The service nodes 406 then proceed to perform state synchronization 410, as detailed above and below. The service nodes 406, for instance, can query a resource model associated with the role 408 to ascertain state information to be used to synchronize the service nodes 406.

Continuing with the scenario 400, the deployment orchestrator 402 then submits a second sync notification 412 to service nodes 414 associated with a role 416. According to various embodiments, the role 416 corresponds to a different role in a service environment than does the role 408. The second sync notification 412, for example, can be submitted to service agents of the service nodes 414. The service nodes 414 then proceed to perform state synchronization 418, as detailed above and below.

In at least some embodiments, the second sync notification 412 is not submitted to the service nodes 414 until the service nodes 406 are finished synchronizing their states. The deployment orchestrator 402, for instance, can track synchronization state for the service nodes 406. When the deployment orchestrator 402 determines that the service nodes 406 are finished synchronizing, the deployment orchestrator 402 can generate the second sync notification 412.

This is not intended to be limiting, however, and alternative embodiments may employ a staggered notification approach such that the second sync notification 412 is generated subsequent to the first sync notification 404, but prior to the service nodes 406 completing their synchronization.

The scenario 400 further illustrates that other sync notifications may optionally be generated and submitted such that further state synchronizations for other nodes (e.g. for other roles) can be performed subsequent to the second sync notification 412 and/or the service nodes 414 finishing their synchronization.

The ordered synchronization illustrated in the scenario 400 can be useful in a number of situations, such as where the order of synchronization for nodes of different roles matters. For instance, the service nodes 414 may depend on the service nodes 406 to be in a synchronized state in order for synchronization of the service nodes 414 to proceed.

Example Procedures

The following discussion describes some example procedures for state synchronization in a service environment in accordance with one or more embodiments. The example procedures may be employed in the environment 100 of FIG. 1, the system 900 of FIG. 9, and/or any other suitable environment.

Figure 5:
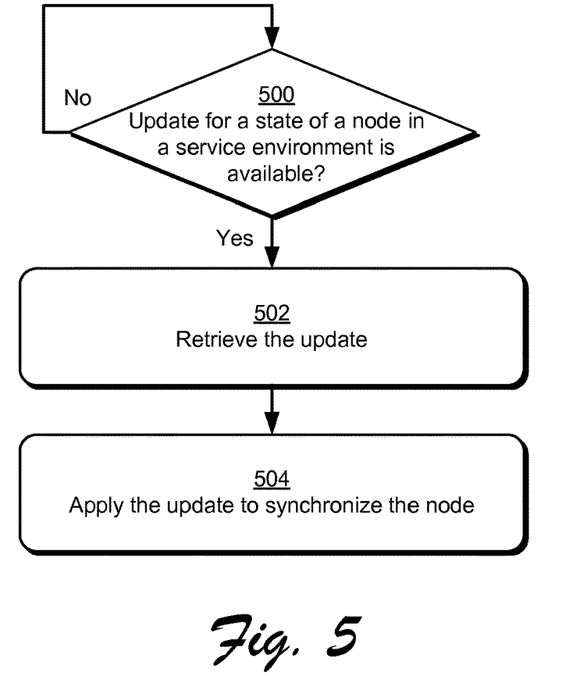
FIG. 5 is a flow diagram that describes steps in a method in accordance with one or more embodiments.

FIG. 5 is a flow diagram that describes steps in a method in accordance with one or more embodiments. The method describes an example implementation of a pull model for synchronizing state for service environment resources in accordance with one or more embodiments.

Step 500 submits a query as to whether an update for a state of a node in a service environment is available. As discussed above, for instance, a service agent for a service node can periodically query a resource (e.g., a configuration manager module) as to whether an update for the service node is available. For example, the state can refer to a software state of the node.

In at least some embodiments, the query can specify a particular role for the node in the service environment. Thus, a determination as to whether an update is available for the node can be based at least in part on a role for the node. A configuration manager module, for instance, can compare the role to a resource model maintained for the role. If the node is not synchronized with the resource model, this can indicate that the node is to be updated.

If an update is not available ("No"), the method returns to step 500. If an update is available ("Yes"), step 502 retrieves the update. A configuration manager module, for instance, can respond to the query that an update is available, e.g., for nodes that assume a particular role in the service environment. In response, a service agent for the node can retrieve the update (e.g., via a configuration package) from a resource repository.

Step 504 applies the update to synchronize the node. Code included in the update, for example, can be installed on the node. As discussed above, applying the update can include modifying software that is already installed on the node, such as repairing software and/or extending functionality of software. Alternatively or additionally, applying the update can include provisioning software on the node for the first time, such as an initial installation of a web application and/or an initial deployment of a service on the node.

Figure 6:
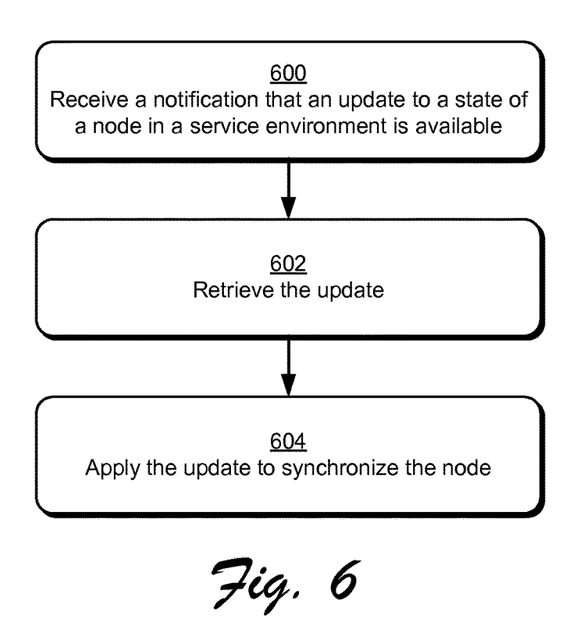
FIG. 6 is a flow diagram that describes steps in a method in accordance with one or more embodiments.

FIG. 6 is a flow diagram that describes steps in a method in accordance with one or more embodiments. The method describes an example implementation of a push model for synchronizing state for service environment resources in accordance with one or more embodiments.

Step 600 receives a notification that an update to a state of a node in a service environment is available. As discussed above, for instance, a service agent for a service node can receive a notification (e.g., from a deployment orchestrator) that an update for the service node is available.

The state update, for instance, can apply to nodes in a particular role in the service environment. Thus, the notification can be sent to nodes that assume that role, and not to other nodes that assume different roles.

Step 602 retrieves the update. A service agent for the node, for example, can retrieve the update (e.g., via a configuration package) from a resource repository. Step 604 applies the update to synchronize the node. Code included in the update, for example, can be installed on the node to patch existing code and/or to install new functionality.

While the pull model described with reference to FIG. 5 and the push model described with reference to FIG. 6 are illustrated as separate models, it is to be appreciated that a particular service environment may employ both models depending on the circumstances involved in a state synchronization scenario. For instance, a typical synchronization scenario may employ the pull model. However, when an order of node synchronization is specified, the push model may be employed, e.g., such that nodes can be notified in a particular order to synchronize their state.

Figure 7:
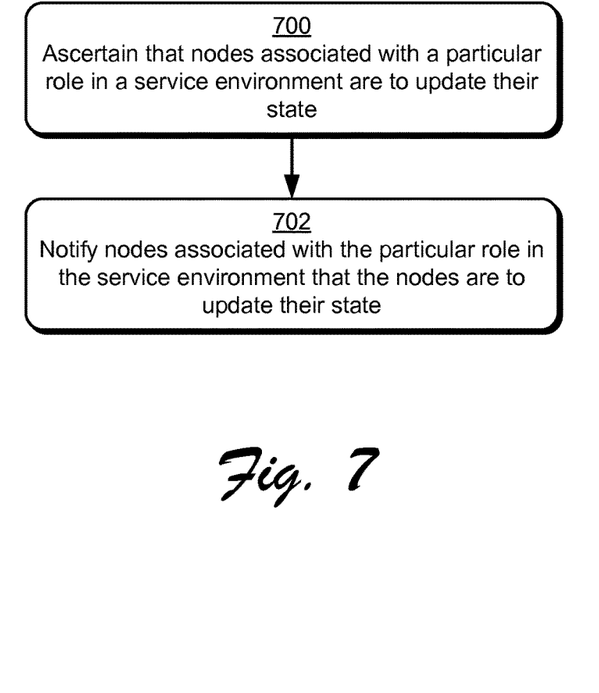
FIG. 7 is a flow diagram that describes steps in a method in accordance with one or more embodiments.

FIG. 7 is a flow diagram that describes steps in a method in accordance with one or more embodiments. The method describes an example embodiment for notifying service nodes that a state update is available.

Step 700 ascertains that nodes associated with a particular role in a service environment are to update their state. A deployment orchestrator, for instance, can receive a notification that a state update is available for nodes of a particular role.

Step 702 notifies nodes associated with the particular role in the service environment that the nodes are to update their state. As discussed above, for example, a deployment orchestrator can track identifiers for individual instances of nodes, and which nodes are associated with which roles. Thus, the deployment orchestrator can identify the nodes associated with the particular role, and can notify those nodes that the nodes are to update their state.

Figure 8:
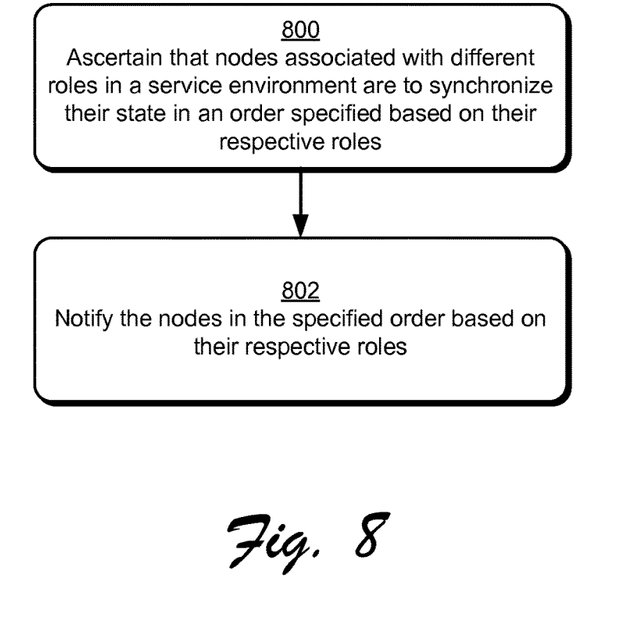
FIG. 8 is a flow diagram that describes steps in a method in accordance with one or more embodiments.

FIG. 8 is a flow diagram that describes steps in a method in accordance with one or more embodiments. The method describes an example embodiment for ordered synchronization of nodes.

Step 800 ascertains that nodes associated with different roles in a service environment are to synchronize their state in an order specified based on their respective roles. A deployment orchestrator, can receive instructions (e.g., from deployment personnel) indicating a synchronization order for the nodes.

Step 802 notifies the nodes in the specified order based on their respective roles. As discussed above, nodes that fulfill a particular role can be notified and/or synchronized prior to notifying nodes that fulfill a different role to synchronize their state.

Having discussed some example procedures, consider now a discussion of an example system and device in accordance with one or more embodiments.

Example System and Device

Figure 9:
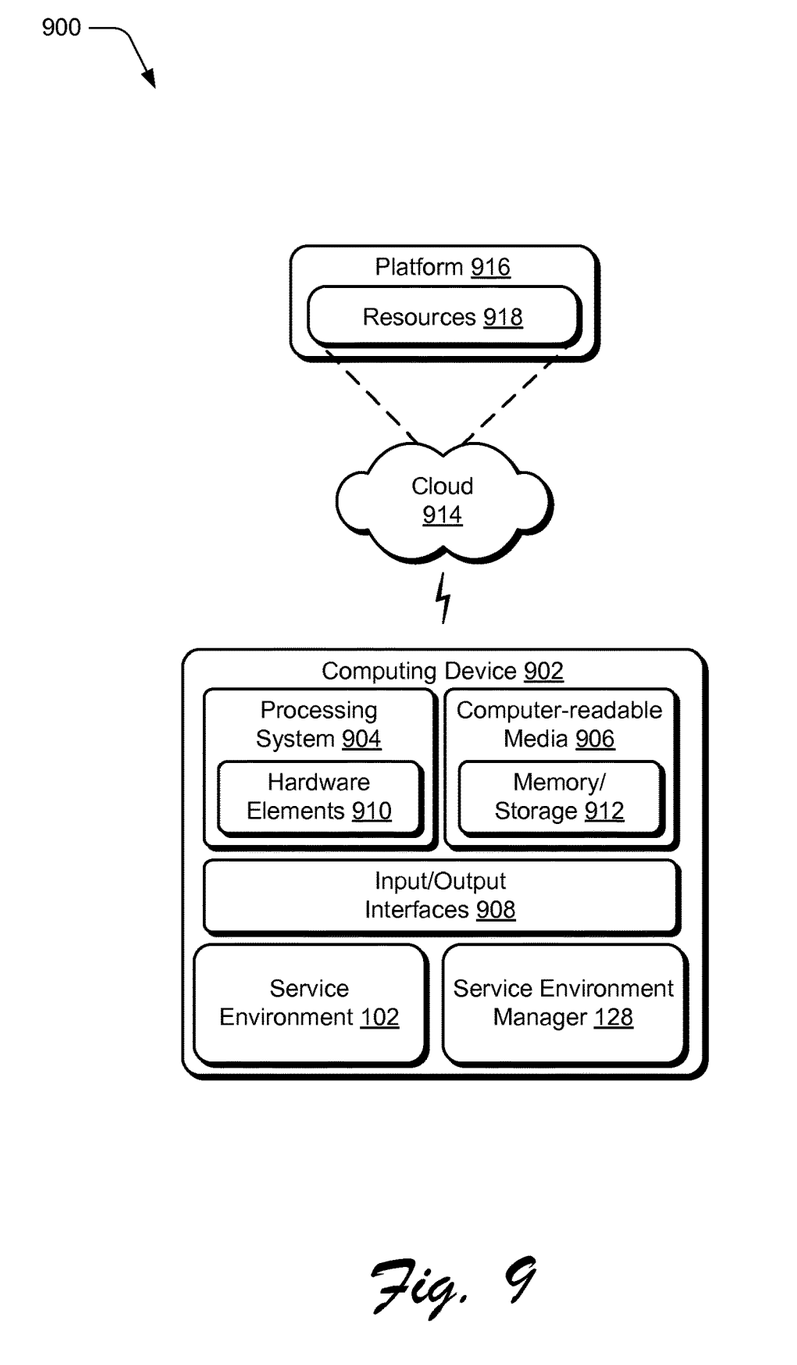
FIG. 9 illustrates an example system and computing device as described with reference to FIG. 1, which are configured to implement embodiments of techniques described herein.

FIG. 9 illustrates an example system generally at 900 that includes an example computing device 902 that is representative of one or more computing systems and/or devices that may implement the various techniques described herein. This is illustrated through inclusion of the service environment 102 and the service environment manager 128, which may be employed to implement techniques for state synchronization in a service environment described discussed herein. The computing device 902 may be, for example, a server of a service provider, a device associated with a client (e.g., a client device), an on-chip system, and/or any other suitable computing device or computing system. In at least some implementations, the computing device 902 represents an example implementation of various device of the service environment 102 introduced in FIG. 1.

The computing device 902 as illustrated includes a processing system 904, one or more computer-readable media 906, and one or more I/O interfaces 908 that are communicatively coupled and/or connected, one to another. Although not shown, the computing device 902 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware elements 910 that may be configured as processors, functional blocks, and so forth. This may include implementation in hardware as an application specific integrated circuit or other logic device formed using one or more semiconductors. The hardware elements 910 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 906 are illustrated as including memory/storage 912. The memory/storage 912 represents memory/storage capacity associated with one or more computer-readable media. The memory/storage 912 may include volatile media (such as random access memory (RAM)) and/or nonvolatile media (such as read only memory (ROM), Flash memory, optical disks, magnetic disks, and so forth). The memory/storage 912 may include fixed media (e.g., RAM, ROM, a fixed hard drive, and so on) as well as removable media (e.g., Flash memory, a removable hard drive, an optical disc, and so forth). The computer-readable media 906 may be configured in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 902 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 902. By way of example, and not limitation, computer-readable media may include "computer-readable storage media" and "computer-readable signal media."

"Computer-readable storage media" refer to media and/or devices that enable persistent storage of information in contrast to mere signal transmission, carrier waves, or signals per se. Thus, computer-readable storage media do not include signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refer to a signal-bearing medium that is configured to transmit instructions to the hardware of the computing device 902, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 910 and computer-readable media 906 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 910. The computing device 902 may be configured to implement particular instructions and/or functions corresponding to the software and/or hardware modules. Accordingly, implementation of a module that is executable by the computing device 902 as software may be achieved at least partially in hardware, e.g., through use of computer-readable storage media and/or hardware elements 910 of the processing system 904. The instructions and/or functions may be executable/operable by one or more articles of manufacture (for example, one or more computing devices 902 and/or processing systems 904) to implement techniques, modules, and examples described herein.

The techniques described herein may be supported by various configurations of the computing device 902 and are not limited to the specific examples of the techniques described herein. This functionality may also be implemented all or in part through use of a distributed system, such as over a "cloud" 914 via a platform 916 as described below.

The cloud 914 includes and/or is representative of a platform 916 for resources 918. The platform 916 abstracts underlying functionality of hardware (e.g., servers) and software resources of the cloud 914. The resources 918 may include applications and/or data that can be utilized while computer processing is executed on servers that are remote from the computing device 902. Resources 918 can also include services provided over the Internet and/or through a subscriber network, such as a cellular or Wi-Fi network.

The platform 916 may abstract resources and functions to connect the computing device 902 with other computing devices. The platform 916 may also serve to abstract scaling of resources to provide a corresponding level of scale to encountered demand for the resources 918 that are implemented via the platform 916. Accordingly, in an interconnected device embodiment, implementation of functionality described herein may be distributed throughout the system 900. For example, the functionality may be implemented in part on the computing device 902 as well as via the platform 916 that abstracts the functionality of the cloud 914.

Discussed herein are a number of methods that may be implemented to perform techniques discussed herein. Aspects of the methods may be implemented in hardware, firmware, or software, or a combination thereof. The methods are shown as a set of blocks that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods can be implemented via interaction between various entities discussed above with reference to the environment 100, the system 900, and so on.

CONCLUSION

Techniques for state synchronization in a service environment are described. Although embodiments are described in language specific to structural features and/or methodological acts, it is to be understood that the embodiments defined in the appended claims are not necessarily limited to the specific features or acts described. Rather, the specific features and acts are disclosed as example forms of implementing the claimed embodiments.

What is claimed is:

1. A system comprising:
   one or more processors; and
   one or more computer-readable storage media storing computer-executable instructions that, responsive to execution by the one or more processors, cause the system to implement functionalities including:
     a configuration manager configured to maintain resource models that each correspond to a different respective role in a service environment and that represent state descriptions for nodes in the service environment that correspond to different respective roles such that a different respective resource model exists for each different respective role, the resource models not including code for synchronizing individual nodes to their respective state description;
     a deployment orchestrator configured to ascertain that nodes associated with different roles in the service environment are to synchronize their state in an order specified based on their respective roles, and notify the nodes in the specified order based on their respective roles;
     a resource repository that is implemented independently of the configuration manager and the deployment orchestrator and that is configured to:
       store configuration packages for updating states of the nodes in the service environment, the configuration packages including code for implementing the resource models; and
       respond to a query from a respective agent that resides on a respective node with a configuration package that includes code for synchronizing the respective node with the respective resource model; and
     an agent associated with a particular role and that resides on a particular node in the service environment, the agent configured to:
       query the configuration manager to determine a particular resource model associated with the particular role; and
       query the resource repository for a particular configuration package for synchronizing the particular node with the particular resource model.

2. A system as described in claim 1, wherein the resource models specify different state information for different roles in the service environment.

3. A system as described in claim 1, wherein the respective resource model identifies a software patch to be applied to nodes in the service environment that correspond to the particular role.

4. A system as described in claim 1, wherein a state description for the particular role identifies at least a portion of an initial service deployment for nodes in the service environment that correspond to the particular role.

5. A system as described in claim 1, wherein responsive to a determination that a state of the particular node is to be synchronized with the respective resource model, the agent is configured to retrieve from the resource repository the configuration package that includes code that is installable on the particular node to synchronize its state with the respective resource model.

6. A system as described in claim 1, wherein the agent is further configured to, independent of a query to the deployment orchestrator, receive a notification that a state of the particular node is to be synchronized with the respective resource model, and to retrieve from the resource repository the configuration package that includes code that is installable on the particular node to synchronize its state with the respective resource model.

7. A system as described in claim 1, wherein the deployment orchestrator is further configured to ascertain that nodes associated with the respective role are to be updated, and to notify instances of the agent that reside on the nodes associated with the respective role that the nodes are to update their state.

8. A system as described in claim 7, wherein:
   the agent is configured to periodically query for an update to synchronization state according to a pull model for synchronization in the service environment; and
   the deployment orchestrator is configured to notify nodes to update their state according to a push model for synchronization in the service environment,
   wherein the system is configured to utilize either the pull model or the push model based on synchronization circumstances in the service environment.

9. A system comprising:
   one or more processors; and
   one or more computer-readable storage media storing computer-executable instructions that, responsive to execution by the one or more processors, cause the system to implement functionalities including:
     a deployment orchestrator configured to ascertain that nodes associated with a particular role in a service environment are to be updated, and to notify instances of an agent associated with the particular role and that reside on the nodes associated with the particular role that the nodes are to update their state;
     a configuration manager configured to maintain resource models that each correspond to a different respective state description for a different respective role in the service environment such that a different respective resource model exists for each different respective role, and to indicate to an instance of an agent that resides on the nodes that the nodes associated with the particular role are to be updated based on a resource model for the particular role, the resource models not including code for synchronizing individual nodes to their respective state description; and
     a resource repository that is implemented independently of the deployment orchestrator and the configuration manager and that is configured to:

store configuration packages for updating states of the nodes in the service environment, the configuration packages including code for implementing the resource models; and respond to queries from the nodes with configuration packages that include code for synchronizing the nodes with their respective resource models.

10. A system as described in claim 9, wherein the resource models specify different state information for different roles in the service environment.

11. A system as described in claim 9, wherein an update to a state of a particular node comprises an installation of a software patch on the particular node.

12. A system as described in claim 9, wherein an update to a state of a particular node comprises at least a portion of an initial service deployment on the particular node.

13. One or more computer-readable storage media comprising instructions stored thereon that, responsive to execution by a computing device, cause the computing device to perform operations comprising:

submitting a query from a node to a configuration manager in a service environment as to whether an update for the node is available based on a role for the node in the service environment, the query identifying the role from among a plurality of roles;

ascertaining based on a response to the query that an update is available for the identified role according to a resource model for the role, such that a different respective resource model exists for each respective one of the plurality of roles;

retrieving the update from a resource repository that is remote from the configuration manager; and applying the update to the node to synchronize a state of the node with a resource model specified for the role.

14. One or more computer-readable storage media as recited in claim 13, wherein said submitting comprises periodically submitting the query.

15. One or more computer-readable storage media as recited in claim 13, wherein said applying comprises applying the update to modify existing software on the node.

16. One or more computer-readable storage media as recited in claim 13, wherein said applying comprises applying the update as at least part of an initial deployment of a service on the node.

17. One or more computer-readable storage media as recited in claim 13, wherein the query further includes an indication of a current software state of the node.

18. A system as described in claim 1, wherein the deployment orchestrator is further configured to determine that nodes associated with a first role are finished updating their state, and in response notify one or more other nodes associated with a second role that the one or more other nodes are to update their state.

19. A system as described in claim 9, wherein the deployment orchestrator is further configured to determine that the nodes associated with the particular role are finished updating their state, and to further notify one or more other nodes associated with a different role that the one or more other nodes are to update their state.

20. A system as described in claim 9, wherein the deployment orchestrator is further configured to communicate state information to the configuration manager that describes a change in state for the one or more nodes associated with the first role to be used to update a resource model for the first role.

* * * * *